United States Patent
Ohgami et al.

(10) Patent No.: US 9,413,021 B2
(45) Date of Patent: Aug. 9, 2016

(54) FUEL CELL SYSTEM AND CONTROL METHOD OF FUEL CELL SYSTEM

(71) Applicant: HONDA MOTOR CO., LTD., Tokyo (JP)

(72) Inventors: Osamu Ohgami, Saitama (JP); Akiji Ando, Saitama (JP); Koichiro Miyata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 14/257,054

(22) Filed: Apr. 21, 2014

(65) Prior Publication Data

US 2014/0322623 A1    Oct. 30, 2014

(30) Foreign Application Priority Data

Apr. 26, 2013    (JP) .................................. 2013-093254

(51) Int. Cl.
*H01M 8/04* (2016.01)
(52) U.S. Cl.
CPC ...... *H01M 8/04753* (2013.01); *H01M 8/04097* (2013.01); *H01M 8/04231* (2013.01); *H01M 2250/20* (2013.01); *Y02E 60/50* (2013.01); *Y02T 90/32* (2013.01)
(58) Field of Classification Search
None
See application file for complete search history.

(56) References Cited

U.S. PATENT DOCUMENTS

| | | | |
|---|---|---|---|
| 7,250,229 B2 | 7/2007 | Yang et al. | |
| 2008/0176116 A1* | 7/2008 | Hayashi ............ | H01M 8/04231 429/429 |
| 2008/0280174 A1* | 11/2008 | Ogawa .............. | H01M 8/04231 429/434 |
| 2009/0136793 A1* | 5/2009 | Kanno .............. | H01M 8/04097 429/483 |
| 2009/0286116 A1* | 11/2009 | Matsumoto ....... | H01M 8/04097 429/415 |
| 2013/0309590 A1 | 11/2013 | Furusawa et al. | |

FOREIGN PATENT DOCUMENTS

| | | |
|---|---|---|
| DE | 102 97 626 T5 | 2/2005 |
| DE | 10 2013 209 200 A1 | 11/2013 |
| JP | 2004-165094 A | 6/2004 |
| JP | 2008257984 A * | 10/2008 |

OTHER PUBLICATIONS

J-Plat Pat Machine Translation of the detailed description of JP 2008-257984A (Oct. 2008).*
German Search Report application No. 10 2014 207 819.9 issued on Aug. 28, 2014.

* cited by examiner

*Primary Examiner* — Gregg Cantelmo
(74) *Attorney, Agent, or Firm* — Squire Patton Boggs (US) LLP

(57) ABSTRACT

Provided is a fuel cell system capable of achieving both of improving purge efficiency and preventing deterioration of the fuel cell, and a control method of the fuel cell system. The fuel cell system includes a circulation rate adjusting unit that adjusts a circulation rate of a circulation gas, a first startup purge unit that performs the first startup purge by opening a purge valve in a state where the circulation rate of the circulation gas is increased to be a mixing promotion rate capable of promoting mixing of the fuel gas with the circulation gas at system startup of the fuel cell system, and a second startup purge unit that performs the second startup purge by opening the purge valve in a state where the gas circulation rate is reduced to be less than the mixing promotion rate after the first startup purge.

8 Claims, 8 Drawing Sheets

FUEL CELL SYSTEM AND CONTROL METHOD OF FUEL CELL SYSTEM

CROSS REFERENCE TO RELATED APPLICATIONS

This application claims the foreign priority benefit under Title 35, United States Code, 119 (a)-(d) of Japanese Patent Application No. 2013-093254 filed on Apr. 26, 2013 in the Japan Patent Office, the disclosure of which is herein incorporated by reference in its entirety.

TECHNICAL FIELD

The present invention relates to a fuel cell system and a control method of the fuel cell system.

BACKGROUND ART

Conventionally, at startup of a fuel cell system, the air staying in an anode flow channel of the fuel cell makes a flow circulating in a circulation flow channel of an anode system through a circulation device such as a circulation pump. Hereby, mixing of supplied hydrogen with the air staying in the anode flow channel is promoted, and elimination of a hydrogen concentration gradient between an inlet side and an outlet side of the anode flow channel of the fuel cell is achieved. Further, at startup of the fuel cell system, a purge (hereinafter, referred to as a "startup purge") for discharging the air staying in the anode flow channel is performed during circulation through the circulation device (refer to Patent Document 1 below).

CITATION LIST

Patent Literature

{Patent Document 1}
Japanese Patent Application Publication No. 2004-165094

SUMMARY OF INVENTION

Technical Problem

However, since a conventional startup purge is performed during circulation through the circulation device, even if a purge valve is open, the amount of a gas discharged is small and purge efficiency is low. On the other hand, if a circulation rate of a gas circulated by the circulation device is reduced in order to improve purge efficiency, the hydrogen concentration gradient between the inlet side and the outlet side of the anode flow channel is not eliminated and there is a possibility that the fuel cell is deteriorated.

Therefore, the present invention has been made in view of the above-described background, and has an object to provide a fuel cell system and a control method of the fuel cell system capable of achieving both of improving purge efficiency and preventing deterioration of the fuel cell.

Solution to Problem

In order to solve the above problem, a fuel cell system according to the present invention is characterized in that the fuel cell system includes a fuel cell for generating power by being supplied with a fuel gas and an oxidant gas, a fuel gas supply passage for connecting the fuel cell and a fuel tank, a fuel off-gas discharge passage in which a fuel off-gas discharged from the fuel cell flows, a fuel off-gas circulation passage for connecting the fuel off-gas discharge passage and the fuel gas supply passage, a purge valve which is disposed on the fuel off-gas discharge passage and on the downstream side of a connection point with the fuel off-gas circulation passage, and discharges the fuel off-gas by the valve opening, a circulation device for circulating the fuel off-gas via the fuel off-gas circulation passage, and a control device for performing a startup purge by dividing the startup purge into a first startup purge and a second startup purge, wherein the control device has a circulation rate adjusting unit that adjusts a circulation rate of a circulation gas circulating via the fuel off-gas circulation passage by controlling a driving amount of the circulation device, a first startup purge unit that performs the first startup purge by opening the purge valve in a state where the circulation rate of the circulation gas is increased to be a mixing promotion rate capable of promoting mixing of the fuel gas with the circulation gas through the circulation rate adjusting unit, and a second startup purge unit that performs the second startup purge by opening the purge valve in a state where the gas circulation rate is reduced to be less than the mixing promotion rate through the circulation rate adjusting unit after the first startup purge.

According to the above invention, the circulation rate of the circulation gas is increased to the mixing promotion rate for promoting mixing of the fuel gas with the circulation gas at startup of the fuel cell system. Therefore, when performing the first startup purge, the air staying in the anode flow channel at startup of the fuel cell system is in a state of being sufficiently mixed with the fuel gas, and a hydrogen concentration gradient between an inlet side and an outlet side of the anode flow channel of the fuel cell is eliminated, and thus a deterioration of the fuel cell is prevented. Further, when performing the second startup purge, since the circulation rate of the circulation gas is reduced, the purge efficiency can be improved by increasing a gas amount toward the purge valve side out of a gas in the fuel off-gas discharge passage, and thereby the gas can be replaced in a relatively short time. As described above, according to the present invention, since the startup purge is performed by dividing the startup charge into the first startup purge and the second startup purge while adjusting the circulation rate of the circulation gas, it is possible to achieve both of improving purge efficiency and preventing deterioration of the fuel cell.

Further, the circulation device preferably includes a circulation pump disposed on the fuel off-gas circulation passage, and the circulation rate adjusting unit preferably adjusts the circulation rate of the circulation gas by controlling a driving rotational speed of the circulation pump.

According to the above configuration, since the circulation pump is used, it is easy to set the circulation rate of the circulation gas to be the mixing promotion rate.

Further, the circulation device preferably includes an ejector which is disposed on a connection point between the fuel gas supply passage and the fuel off-gas circulation passage, a first fuel supply unit which is disposed on the fuel gas supply passage and on the upstream side of the ejector and controls a supply amount of the fuel gas, a bypass supply passage which is bifurcated from the fuel gas supply passage and connected to the fuel gas supply passage by bypassing the first fuel supply unit and the ejector, and a second fuel supply unit which is disposed on the bypass supply passage, and further, the circulation rate adjusting unit preferably adjusts the circulation rate of the circulation gas by controlling driving of the first fuel supply unit and the second fuel supply unit.

According to the above configuration, by adjusting the fuel gas supplied by the first fuel supply unit, it is possible to set the circulation rate of the circulation gas discharged via the ejector to be the mixing promotion rate.

Further, the control device preferably has a power generation start unit that starts power generation in the fuel cell, and the power generation start unit preferably starts power generation in the fuel cell after completing the first startup purge.

According to the above configuration, since the fuel cell starts power generation after completing the first startup purge in the startup purge, it is possible to shorten a time until supplying power from a system startup. Note that, when completing the first startup purge, the air staying in the anode flow channel is sufficiently mixed with the fuel gas, and a new fuel gas is diffused in the anode flow channel of the fuel cell. Therefore, there is no possibility of a stoichiometric deficiency even if the power generation is started after completing the first startup purge.

Further, the fuel cell system preferably includes an oxidant gas supply passage in which the oxidant gas is supplied by connecting the fuel cell and an air pump, an oxidant off-gas discharge passage in which an oxidant off-gas discharged from the fuel cell flows, and a dilution part for diluting the fuel off-gas with the oxidant off-gas, wherein the control unit preferably has an oxidant gas supply amount adjusting unit that adjusts a supply amount of the oxidant gas by controlling a driving rotational speed of the air pump, and wherein the oxidant gas supply amount adjusting unit preferably increases the supply amount of the oxidant gas until the completion of the second startup purge since a start of the power generation in the fuel cell so as to be more than a load equivalent amount corresponding to a load state in the fuel cell.

According to the above configuration, since the oxidant gas which is increased to be more than the load equivalent amount corresponding to the load state in the fuel cell is supplied, the fuel off-gas in the exhaust gas diluted by the dilution part is prevented from increasing a concentration thereof even if the second startup purge is performed after starting power generation in the fuel cell.

Further, the control device preferably has a pressure regulating unit that regulates a pressure of the fuel gas supplied to the fuel cell, and the pressure regulating unit preferably reduces the pressure of the fuel gas during performing the second startup purge to be less than that during performing the first startup purge.

According to the above configuration, the purge efficiency when performing the second startup purge is further improved.

Further, in order to solve the above problem, a fuel cell system control method according to the present invention is a control method of a fuel cell system including a fuel cell for generating power by being supplied with a fuel gas and an oxidant gas, a fuel gas supply passage for connecting the fuel cell and a fuel tank, a fuel off-gas discharge passage in which a fuel off-gas discharged from the fuel cell flows, a fuel off-gas circulation passage for connecting the fuel off-gas discharge passage and the fuel gas supply passage, a purge valve which is disposed on the fuel off-gas discharge passage and on the downstream side of a connection point with the fuel off-gas circulation passage, and discharges the fuel off-gas by the valve opening a circulation device for circulating the fuel off-gas via the fuel off-gas circulation passage, and a control device for performing a startup purge by dividing the startup purge into a first startup purge and a second startup purge, wherein the control device has a circulation rate adjusting unit that adjusts a circulation rate of a circulation gas by controlling a driving amount of the circulation device, a first startup purge unit that performs the first startup purge, and a second startup purge unit that performs the second startup purge after the first startup purge, and wherein the fuel cell system control method includes following steps: a step of detecting a startup signal of the fuel cell, a step of increasing the circulation rate of the circulation gas to a mixing promotion rate capable of promoting mixing of the fuel gas with the circulation gas by controlling the circulation device through the circulation rate adjusting unit after detecting the startup signal, a step of performing the first startup purge by opening the purge valve through the first startup purge unit after increasing the circulation rate of the circulation gas, a step of performing the second startup purge by opening the purge valve through the second startup purge unit after completing the first startup purge, and a step of reducing the gas circulation rate to be less than the mixing promotion rate by controlling the circulation device through the circulation rate adjusting unit before completing the second startup purge and after completing the first startup purge.

According to the above invention, by the step of increasing the circulation rate of the circulation gas to the mixing promotion rate, the air staying in the anode flow channel at startup of the fuel cell system is in a state of being sufficiently mixed with the fuel gas. Therefore, the concentration gradient of the fuel gas in the anode flow channel is eliminated, and the deterioration of the fuel cell is prevented. Further, by the step of reducing the gas circulation rate to be less than the mixing promotion rate, the circulation gas is reduced. Therefore, since the second startup purge is performed in a state where the circulation gas is reduced, the gas amount toward the purge valve side out of the gas in the fuel off-gas discharge passage can be increased, and thereby the purge efficiency can be improved. As a consequence, the present invention can achieve both of improving purge efficiency and preventing deterioration of the fuel cell.

Further, in order to solve the above problem, a fuel cell system control method according to the present invention is a control method of a fuel cell system including a fuel cell for generating power by being supplied with a fuel gas and an oxidant gas, a fuel gas supply passage for connecting the fuel cell and a fuel tank, a fuel off-gas discharge passage in which a fuel off-gas discharged from the fuel cell flows, a fuel off-gas circulation passage for connecting the fuel off-gas discharge passage and the fuel gas supply passage, a purge valve which is disposed on the fuel off-gas discharge passage and on the downstream side of a connection point with the fuel off-gas circulation passage, and discharges the fuel off-gas by the valve opening, a circulation device for circulating the fuel off-gas via the fuel off-gas circulation passage, and a control device for performing a startup purge by dividing the startup purge into a first startup purge and a second startup purge, wherein the control device has a circulation rate adjusting unit that adjusts a circulation rate of a circulation gas by controlling a driving amount of the circulation device, a first startup purge unit that performs the first startup purge, and a second startup purge unit that performs the second startup purge after the first startup purge, and wherein the fuel cell system control method includes following steps: a step of detecting a startup signal of the fuel cell, a step of increasing the circulation rate of the circulation gas to a mixing promotion rate capable of promoting mixing of the fuel gas with the circulation gas by controlling the circulation device through the circulation rate adjusting unit after detecting the startup signal, a step of waiting until a pressure in a fuel gas flow passage of the fuel cell becomes a predetermined pressure to allow power generation after increasing the circulation rate of the circulation gas, a step of determining whether or not a soak time of the fuel cell is within a predetermined time not to require performing the first startup purge after the step of waiting, a step of allowing power generation in the fuel cell without performing the first startup purge when it is determined that the soak time of the fuel cell is within the predetermined time, a step of performing the second startup purge by opening the purge valve through the second startup purge unit after the step of allowing power generation, and a step of reducing the gas circulation rate to be less than the mixing promotion rate by controlling the circulation device through the circulation rate adjusting unit before completing the second startup purge and after allowing power generation.

According to the above invention, by the step of increasing the circulation rate of the circulation gas to the mixing promotion rate, the air staying in the anode flow channel at startup of the fuel cell system becomes in a state of being sufficiently mixed with the fuel gas. Therefore, the concentration gradient of the fuel gas in the anode flow channel is eliminated, and the deterioration of the fuel cell is prevented. Further, when performing the second purge, since the circulation gas is reduced by the step of reducing the gas circulation rate to be less than the mixing promotion rate, the gas amount toward the purge valve side out of the gas in the fuel off-gas discharge passage can be increased, and thereby the purge efficiency can be improved. As a consequence, the present invention can achieve both of improving purge efficiency and preventing deterioration of the fuel cell. Furthermore, when it is determined that the soak time of the fuel cell is within the predetermined time, since the fuel cell is allowed to start power generation without performing the first startup purge, it is possible to shorten a time to the power generation start.

Advantageous Effects of Invention

According to the present invention, it is possible to provide a fuel cell system and a control method of the fuel cell system capable of achieving both of improving purge efficiency and preventing deterioration of the fuel cell.

DESCRIPTION OF EMBODIMENTS (First Embodiment)

The first embodiment according to the present invention will be described with reference to FIGS. 1 to 4. Note that, a fuel cell system 1 according to the embodiment is mounted on a fuel cell vehicle which is not shown. The fuel cell vehicle is, for example, four-wheel vehicle, three-wheeled vehicle, motorcycle, unicycle, train, and the like. However, the fuel cell system 1 may be configured to be mounted on other mobiles such as ship or aircraft. Further, it may be applied to those of the stationary for commercial or home use.

Figure 1:
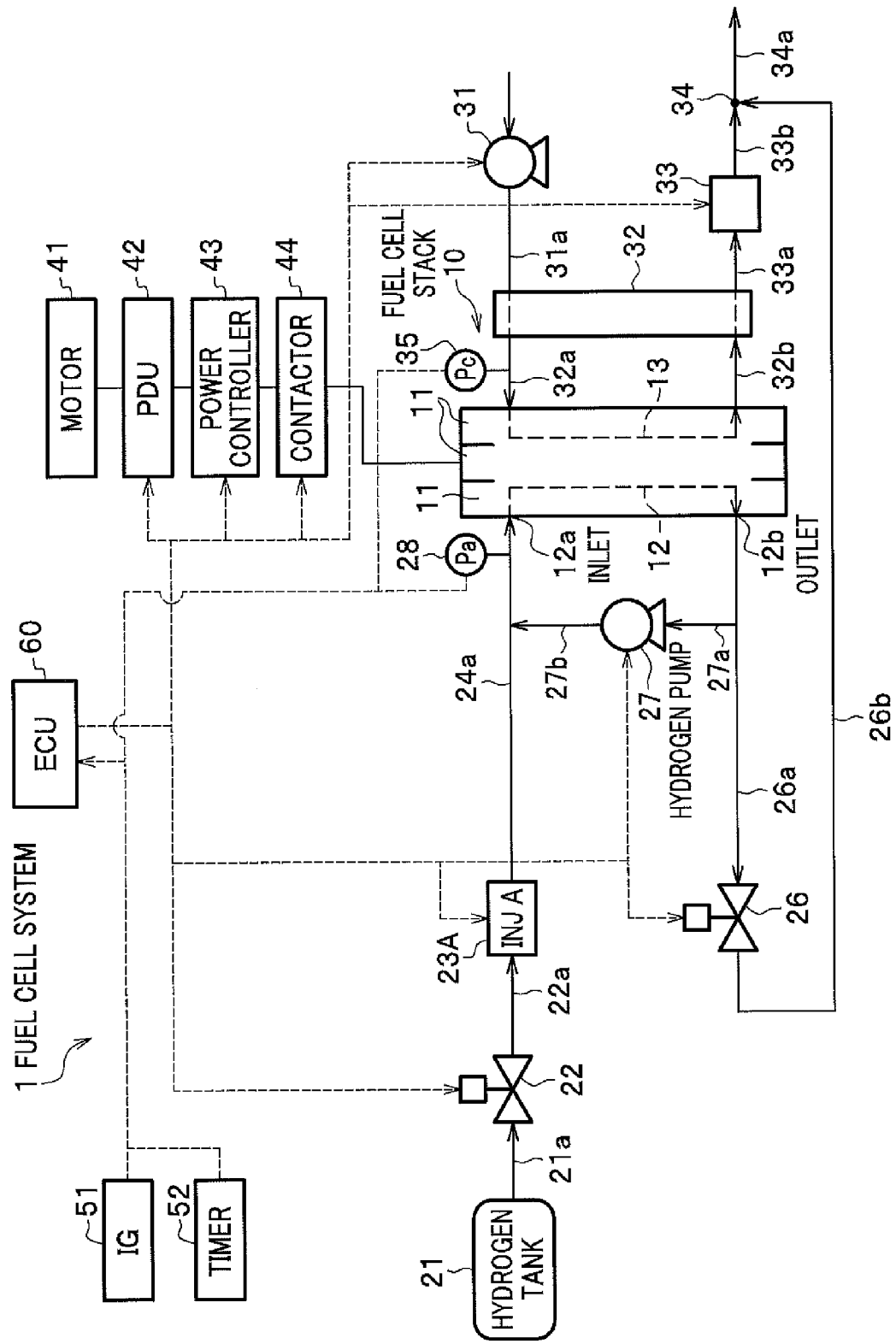
FIG. 1 is an overall block diagram of a fuel cell system according to a first embodiment of the present invention.

As shown in FIG. 1, the fuel cell system 1 according to the first embodiment includes a fuel cell stack 10, an anode system for supplying and discharging hydrogen (fuel gas) to and from an anode of the fuel cell stack 10, a cathode system for supplying and discharging air (oxidant gas) containing oxygen to and from a cathode of the fuel cell stack 10, a power control system for controlling power generation in the fuel cell stack 10, and an ECU (Electronic Control Unit) 60 for electronically controlling these.

The fuel cell stack 10 is a stack which is constructed by stacking a plurality of single cells 11 of solid polymer type, and the plurality of single cells 11 are electrically connected in series. The single cell 11 includes a MEA (Membrane Electrode Assembly) and two conductive separators sandwiching the MEA. The MEA includes an electrolyte membrane (solid polymer membrane) made of a monovalent cation exchange membrane or the like, an anode and a cathode (electrodes) which sandwich the electrolyte membrane.

Each of the separators is formed with a groove for supplying air or hydrogen to an entire surface of the MEA and a through hole for supplying and discharging air or hydrogen to and from the single cell 11, and these grooves and through holes function as an anode flow channel 12 (fuel gas flow passage) and a cathode flow channel 13 (oxidant gas flow passage), respectively. When hydrogen is supplied to each anode via the anode flow channel 12 and air is supplied to each cathode via the cathode flow channel 13, a potential difference (OCV (Open Circuit Voltage)) occurs in each single cell 11. Subsequently, when the fuel cell stack 10 is electrically connected to an external circuit such as a motor 41 to obtain the current, the fuel cell stack 10 generates power.

The anode system mainly includes a hydrogen tank 21 (fuel gas supply source), a normally closed type shut-off valve 22, a first injector 23A (fuel gas supply pressure regulating unit: referred to as "INJ A" in the drawings), a purge valve 26, a hydrogen pump 27, and a pressure sensor 28. Further, the anode system is provided with a pipe 21a, a pipe 22a, and a pipe 24a as a fuel gas supply passage for connecting the hydrogen tank 21 to an inlet 12a of the anode flow channel 12.

The hydrogen tank 21 is a tank in which hydrogen is enclosed under high pressure. Further, the shut-off valve 22 is an electromagnetically actuated valve which is connected to the hydrogen tank 21 via the pipe 21a and is opened or closed in accordance with an instruction from the ECU 60.

The first injector 23A is operative to inject hydrogen intermittently during normal operation by being electronically controlled by the ECU 60, and is able to inject hydrogen continuously for a short time at startup with a high pressure. The first injector 23A is configured by combining known components such as a housing, a solenoid, a plunger, a compression coil spring, and a nozzle. Further, the first injector 23A is connected to the shut-off valve 22 via the pipe 22a, and connected to the anode flow channel 12 of the fuel cell stack 10 via the pipe 24a. In a state where the shut-off valve 22 is open, when the first injector 23A injects hydrogen, the hydrogen in the hydrogen tank 21 is adapted to be supplied to the anode flow channel 12 through the pipe 21a and the like.

Further, the pipe 26a is connected to an outlet 12b of the anode flow channel 12 of the fuel cell. The pipe 26a is connected to a dilution part 34 to be described later via the purge valve 26 and a pipe 26b. The purge valve 26 is opened by the ECU 60, when purging impurities (water vapor, nitrogen, and the like) contained in an anode off-gas circulating in an anode circulation flow channel (anode flow channel 12, pipes 26a, 27a, 27b, 24a) during power generation in the fuel cell stack 10, and when replacing the air in the anode flow channel 12 with hydrogen at system startup.

The hydrogen pump 27 is a hydrogen pump (circulation rate adjusting unit) which circulates the anode off-gas (fuel off-gas) discharged from the outlet 12b of the anode flow channel 12 back to the inlet 12a of the anode flow channel 12, and is controlled by an instruction from the ECU 60. Note that, an inlet port of the hydrogen pump 27 is connected to the pipe 26a via the pipe 27a, and an outlet port of the hydrogen pump 27 is connected to the pipe 24a via the pipe 27b.

The pressure sensor 28 is attached to the pipe 24a in the vicinity of the inlet 12a of the anode flow channel 12. Further, the pressure sensor 28 is adapted to detect a pressure (substantially equal to an anode pressure in the anode flow channel 12) in the pipe 24a, and to output the detected pressure to the ECU 60. Note that, the pressure sensor 28 may be attached to the pipe 26a in the vicinity of the outlet 12b of the anode flow channel 12.

The cathode system includes an air pump 31, a humidifier 32, a back pressure valve 33, a dilution part 34, a pressure sensor 35, and the like.

A discharge port of the air pump 31 is connected to an inlet of the cathode flow channel 13 via a pipe 31a, the humidifier 32, and a pipe 32a. Further, the air pump 31 is operated to be driven by a motor (not shown), and when operating in accordance with an instruction of the ECU 60, it is adapted to take in air containing oxygen and supply the air to the cathode flow channel 13.

An outlet of the cathode flow channel 13 is connected to the dilution part 34 via a pipe 32b, the humidifier 32, a pipe 33a, the back pressure valve 33, and a pipe 33b.

The humidifier 32 includes a water permeable hollow fiber membrane (not shown), and is adapted to exchange moisture between a fresh air from the air pump 31 and a humid cathode off-gas from the outlet of the cathode flow channel 13 through the hollow fiber membrane, to humidify the fresh air.

The back pressure valve 33 is constituted by a normally open type butterfly valve or the like, and is adapted to control a back pressure thereof (a pressure in the cathode flow channel 13) in accordance with an instruction of the ECU 60. Incidentally, the pressure of the cathode can be raised or lowered by controlling the back pressure valve 33 so that a differential pressure between electrodes of the anode and the cathode does not become too large.

The dilution part 34 is a part where the pipe 33b and the pipe 26b are connected to each other. Accordingly, at the dilution part 34, the anode off-gas flowing in the pipe 26b and the cathode off-gas flowing in the pipe 33b join together, and the anode off-gas is diluted by the cathode off-gas. Then, the diluted anode off-gas is discharged to the outside of the vehicle via the pipe 34a.

The pressure sensor 35 is attached to the pipe 32a in the vicinity of the inlet of the cathode flow channel 13. Further, the pressure sensor 35 is adapted to detect a pressure (substantially equal to the pressure in the cathode flow channel 13) in the pipe 32a, and to output the detected pressure to the ECU 60. Note that, the pressure sensor 35 may be attached to the pipe 32b in the vicinity of the outlet of the cathode flow channel 13.

The power control system includes a motor 41, a PDU 42 (Power Drive Unit), a power controller 43, contactor 44, and the like. The motor 41 is connected to an output terminal (not shown) of the fuel cell stack 10 via the PDU 42, the power controller 43, and the contactor 44.

The motor 41 is an electric motor which generates a driving force for driving the fuel cell vehicle.

The PDU 42 is an inverter which converts a DC power from the power controller 43 to a three-phase AC power and supplies the converted AC power to the motor 41, in accordance with an instruction of the ECU 60.

The power controller 43 includes various electronic circuits such as DC-DC chopper circuit, and has a function of controlling outputs (generated power, current value, voltage value) of the fuel cell stack 10 in accordance with an instruction of the ECU60.

The contactor 44 is disposed between the fuel cell stack 10 and the power controller 43, and is configured to include a switch for connecting or blocking the fuel cell stack 10 and external loads such as a motor 41, and is opened or closed by the ECU 60.

An IG 51 is a startup switch for the fuel cell system 1 (fuel cell vehicle), and is disposed around a driver's seat. Further, the IG 51 is connected to the ECU 60, and the ECU 60 is adapted to detect an ON signal (a system startup signal) and an OFF signal (a system stop signal) of the IG 51.

A timer 52 is adapted to measure a soak time (stop duration) of the fuel cell stack 10 until the detection of the ON signal from the detection of the OFF signal of the IG 51, and to output the measured soak time to the ECU 60.

The ECU 60 is a control device for electronically controlling the fuel cell system 1, and is configured to include a CPU (Central Processing Unit), a ROM (Read Only Memory), a RAM (Random Access Memory), various interfaces, an electronic circuit, and the like. Further, the ECU 60 is adapted to control various devices and performs various processes in accordance with a program stored therein.

The ECU 60 has a function of PWM (Pulse Width Modulation) control for the first injector 23A. Further, the ECU 60 has a function of controlling a flow rate of hydrogen which is injected from the first injector 23A and supplied to the anode flow channel 12, by varying a ratio of an opening instruction (a valve opening time [Ti value], ON duty) outputted to the first injector 23A with respect to an interval (interval between a valve opening start and the next valve opening start, a reference period).

The ECU 60 has a function (an oxidant gas supply amount adjusting unit) of adjusting a flow rate of oxygen to be supplied to the cathode by controlling a driving of the air pump 31 and a driving rotational speed thereof. Note that, the flow rate of the oxygen which is supplied to the cathode by the oxidant gas supply amount adjusting unit will be described later.

The ECU 60 has a function (circulation rate adjusting unit) of adjusting a circulation rate of a circulation gas circulating in the anode circulation flow channel (the anode flow channel 12, a part of the pipe 26a, the pipes 27a, 27b, and a part of the pipe 24a), by controlling a driving of the hydrogen pump 27 and a driving rotational speed thereof. Further, the ECU 60 has a function of making a gas flow which circulates in the anode circulation flow channel by driving the hydrogen pump 27 when the ECU 60 detects the ON signal of the IG 51, and of controlling the driving rotational speed of the hydrogen pump 27 so that the circulation rate of the circulating gas becomes a mixing promotion rate. Note that, the mixing promotion rate is a flow rate capable of promoting mixing of hydrogen with air (mainly nitrogen) by circulating the hydrogen in a short time in the anode circulation flow channel when the hydrogen is supplied to the circulating gas flow, and is a flow rate for eliminating a concentration gradient of the hydrogen between the inlet 12a side and the outlet 12b side of the anode flow channel 12. Further, the ECU 60 has a function of controlling the circulation rate of the circulation gas circulating in the anode system so as to be a circulation rate (hereinafter, referred to as "reduced circulation rate") less than the mixing promotion rate, by stopping the driving of the hydrogen pump 27 or by reducing the driving rotational speed thereof when a power generation allowed flag to be described later is set. Here, the reduced circulation rate is not limited to a specific rate if it is less than the mixing promotion rate. Further, the reduced circulation rate includes a circulation rate in a state where there is not a circulation amount of the circulation gas at all without driving the hydrogen pump 27 (hereinafter, merely referred to as "the circulation rate is zero"). Note that, in the present embodiment, with respect to the reduced circulation rate, a case in which the circulation rate is zero by stopping the driving of the hydrogen pump 27 will be described as an example. However, if there is a possibility of a stoichiometric deficiency by being in a state where the circulation rate is zero, the driving rotational speed of the hydrogen pump 27 may be set to be a minimum circulation rate required for eliminating the stoichiometric deficiency by reducing the driving rotational speed of the hydrogen pump 27.

Figure 2:
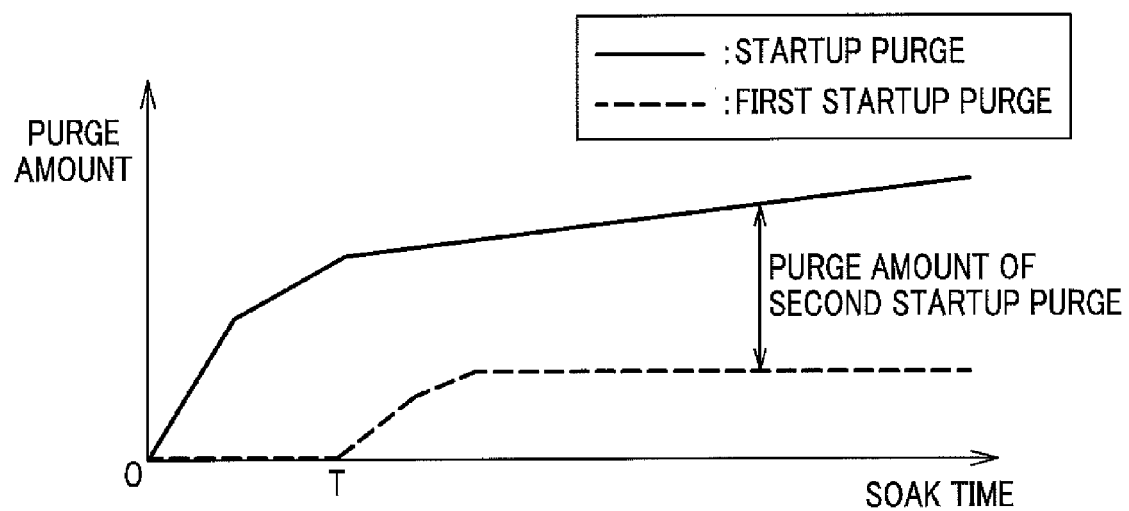
FIG. 2 is a map showing corresponding relationships between a soak time and a total purge amount of a startup purge, and between the soak time and a purge amount of a first startup purge.

The ECU 60 has a function of performing a startup purge by continuously opening the purge valve 26 if the anode pressure detected by the pressure sensor 28 is higher than or equal to a predetermined value after the ON signal of the IG 51 is detected. Here, a purge amount by the startup purge is a discharge amount required for discharging the air staying in the anode flow channel 12 of the fuel cell stack 10 to be replaced with hydrogen. Further, in the present invention, as shown in FIG. 2, it is possible to derive the purge amount corresponding to the soak time measured by the timer 52 based on a map obtained by a test or the like in advance. Note that, as shown in FIG. 2, since the air staying in the anode flow channel 12 increases as the soak time becomes longer, the startup purge amount is also adapted to increase. In the present embodiment, when performing the startup purge, the purge valve 26 is configured to be continuously open, however, the present invention is not limited to this, and the purge valve 26 may be configured to be opened and closed if a predetermined purge amount can be purged.

Further, the ECU 60 has a function (a first startup purge unit and a second startup purge unit) of performing the startup purge by dividing the startup purge into a first startup purge and a second startup purge. The first startup purge is a startup purge which is performed when the anode pressure becomes a predetermined pressure after the ON signal of the IG 51 is detected. Note that, the predetermined pressure as referred to herein will be described later. Further, a purge amount by the first startup purge is an amount capable of eliminating the stoichiometric deficiency in the fuel cell, and is adapted to be derived in accordance with the soak time measured by the timer 52 based on the map obtained by the test or the like in advance (see FIG. 2). Note that, the ECU 60 has a function (power generation allowing unit) of allowing power generation with setting of the power generation allowed flag when the first startup purge is completed. However, as shown in FIG. 2, if the soak time is shorter than a predetermined time T, in other words, if the amount of the hydrogen remaining in the anode flow channel 12 of the fuel cell stack 10 is much while the amount of the air passing through to the anode flow channel 12 via the electrolyte membrane from the cathode flow channel 13 is small, there is a low possibility of stoichiometric deficiency even if the power generation in the fuel cell stack 10 is started. Therefore, if the soak time is shorter than the predetermined time T, the ECU 60 is adapted to allow power generation with setting of the power generation allowed flag without performing the first startup purge.

On the other hand, the second startup purge is a startup purge which is performed after the power generation allowed flag is set. In the present embodiment, the second startup purge is adapted to be performed when a predetermined waiting time elapses after the power generation allowed flag is set. Note that, the predetermined waiting time will be described later. Further, a purge amount by the second startup purge is an amount obtained by subtracting the first startup purge amount from the total startup purge amount (see FIG. 2). Note that, the ECU 60 has a function (pressure adjusting unit) of reducing the pressure in the anode flow channel 12 by reducing the flow rate of the hydrogen which is injected from the first injector 23A to be supplied to the anode flow channel 12 while performing the second startup purge.

Next, an operation when the ECU 60 detects the ON signal (system startup signal) of the IG 51 and starts up the fuel cell system 1 will be described with reference to FIGS. 3 and 4. Note that, during shutdown (IG-OFF time) of the fuel cell system 1, the supply of hydrogen and air to the fuel cell stack 10 is stopped, and the power generation in the fuel cell stack 10 is stopped. Further, the purge valve 26 is closed.

Figure 3:
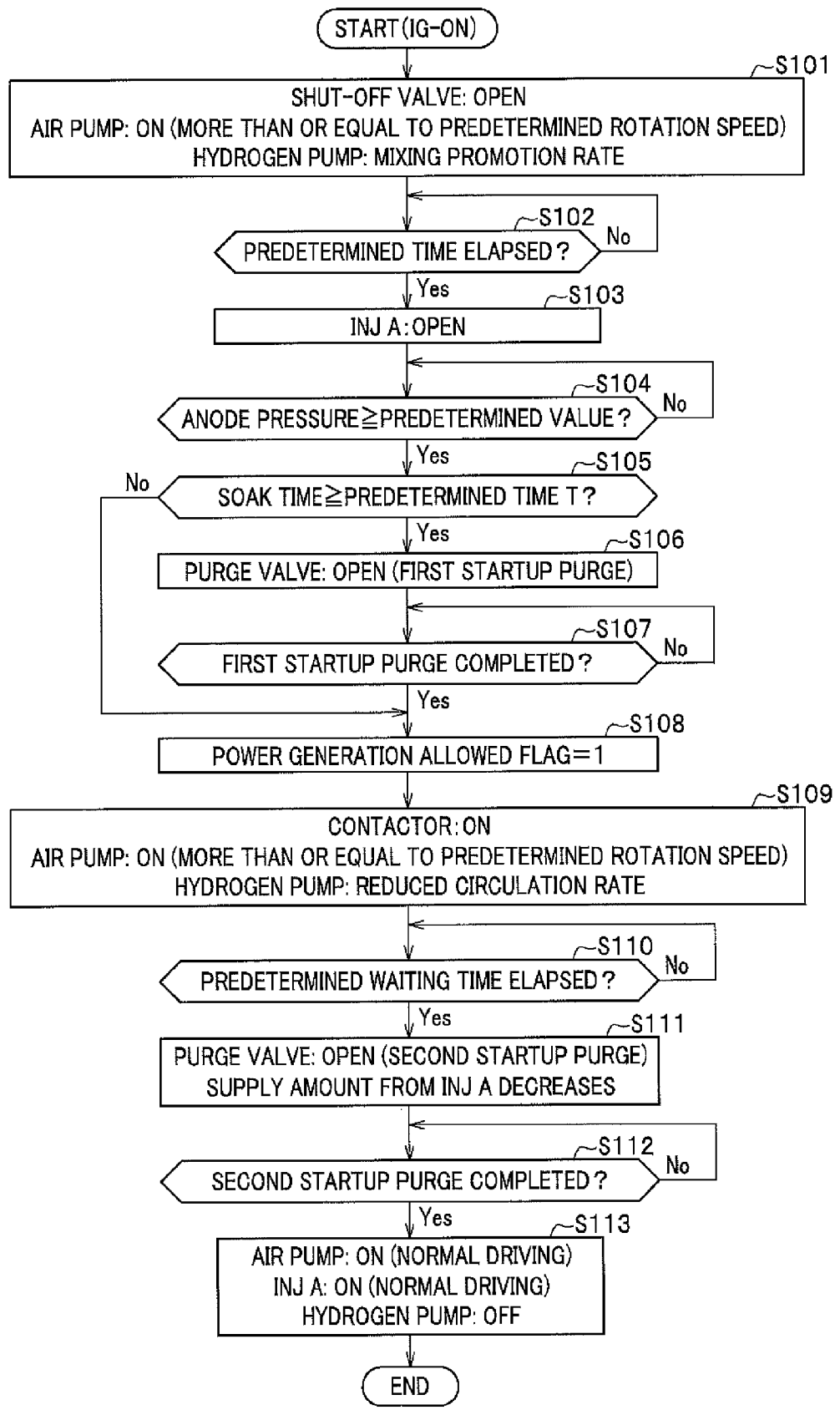
FIG. 3 is a flowchart showing an operation flow of the fuel cell system at startup of the fuel cell system in the first embodiment.
Figure 4:
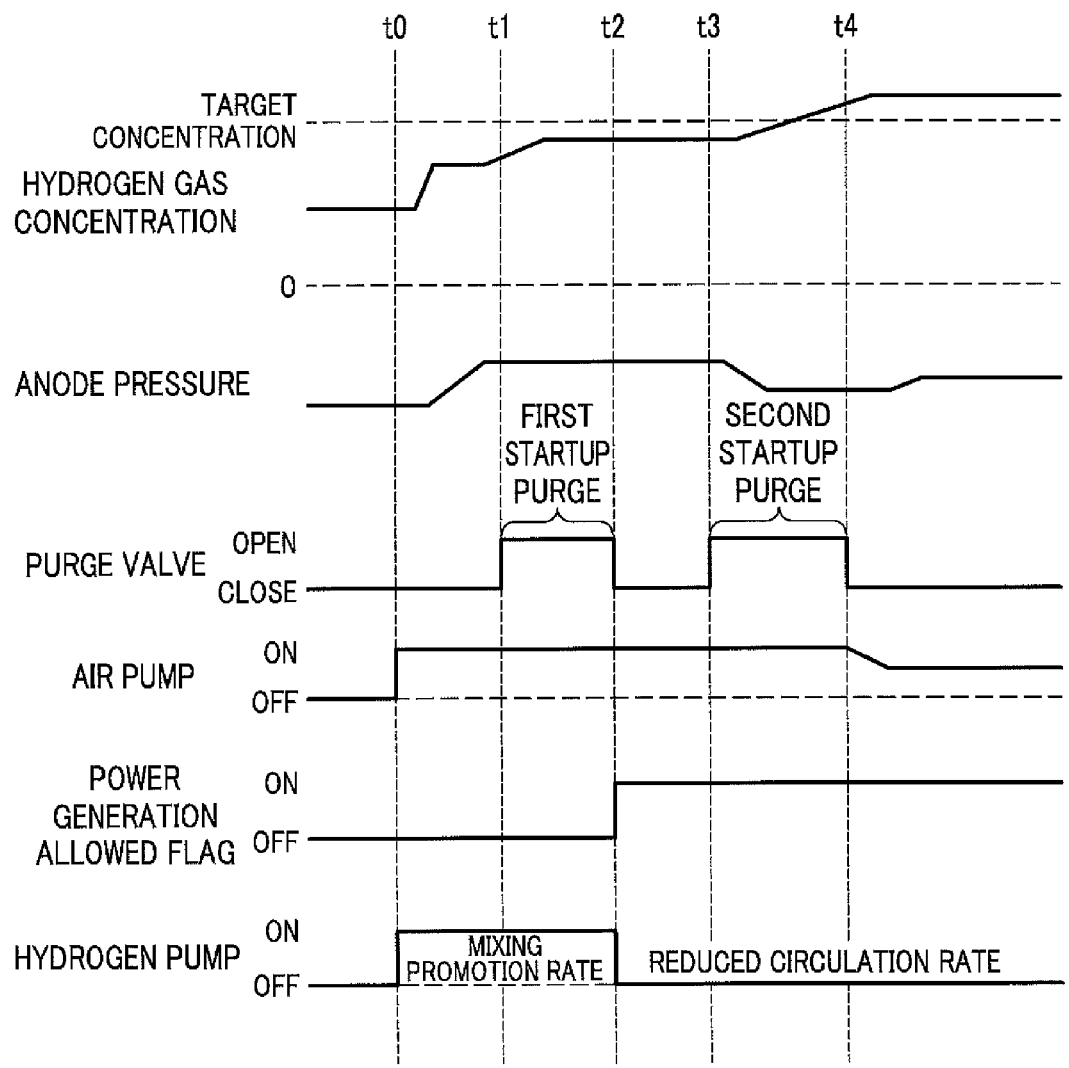
FIG. 4 is a timing chart showing an operation example of the fuel cell system at startup of the fuel cell system in the first embodiment.

As shown in FIG. 3, when the ECU 60 detects the ON signal of the IG 51 (START), the ECU 60 opens the shut-off valve 22 in Step S101 (refer to the time "t0" in FIG. 4). Note that, since the first injector 23A is closed at this time, the hydrogen in the hydrogen tank 21 stays at a position on the upstream side of the first injector 23A after being decompressed by a pressure reducing valve (not shown).

Further, in Step S101, the ECU 60 supplies air to the cathode flow channel 13 by actuating (turning ON) the air pump 31 (refer to the time "t0" in FIG. 4). Note that, in this case, the air pump 31 is driven at a rotational speed higher than or equal to a predetermined rotational speed (higher than that in the normal power generation), and is adapted to supply the increased oxygen more than that in the normal power generation.

Further, in Step S101, the ECU 60 starts driving (turns ON) the hydrogen pump 27, and controls the driving rotational speed of the hydrogen pump 27 so as to be the mixing promotion rate (refer to the time "t0" in FIG. 4). Hereby, the air which has stayed in the anode flow channel 12 in the soak time starts circulating in the anode circulation flow channel (the anode flow channel 12, a part of the pipe 26a, the pipes 27a, 27b, and a part of the pipe 24a).

Then, proceeding to Step 102, the ECU 60 determines whether or not a predetermined time has elapsed. Note that, the predetermined time means a time required for the air circulating in the anode flow channel to reach the mixing promotion rate since the start of the driving of the hydrogen pump 27, and is determined based on a test or the like in advance.

In Step S102, if the ECU 60 determines that the predetermined time has elapsed (Yes), it proceeds to Step S103, and if the ECU 60 determines that the predetermined time has not elapsed (No), it repeats the process in Step S102.

In Step S103, the ECU 60 opens the first injector 23A. Hereby, the supplied hydrogen circulates in the anode circulation flow channel, and the hydrogen and the air start mixing with each other.

Proceeding to Step S104, the ECU 60 determines whether or not the anode pressure detected by the pressure sensor 28 is higher than or equal to a predetermined value. Note that, the predetermined value (target pressure) is a pressure value capable of determining that the stoichiometric deficiency does not occur even if the power generation in the fuel cell stack 10 is started (even if the power generation current of the fuel cell stack 10 is obtained by turning ON the contactor 44), and is determined based on a test or the like in advance.

In Step S104, if the ECU 60 determines that the anode pressure is lower than the predetermined value (No), it waits until the anode pressure becomes higher than or equal to the predetermined value while repeating the process in Step 104. On the other hand, if the ECU 60 determines that the anode pressure is higher than or equal to the predetermined value (Yes), it proceeds to Step 105.

In Step S105, the ECU 60 determines whether or not the soak time is longer than or equal to the predetermined time T (see FIG. 2).

In Step S105, if the ECU 60 determines that the soak time is longer than or equal to the predetermined time T (Yes), it proceeds to Step S106, and if the ECU 60 determines that the soak time is shorter than the predetermined time T (No), it proceeds to Step S108. Note that, the case to proceed to Step S108 is a case in which the hydrogen remaining in the anode flow channel 12 of the fuel cell stack 10 is so much that there is no possibility that the stoichiometric deficiency occurs even if power generation in the fuel cell stack 10 is started.

In Step S106, the ECU 60 performs the first startup purge by continuously opening the purge valve 26 (refer to the time "t1" in FIG. 4). Hereby, out of the total purge amount of the startup purge, the purge amount of the first startup purge is discharged. Further, even if the purge valve 26 is opened in this case, there is no possibility that hydrogen of high concentration is discharged to the outside of the vehicle, because the driving rotational speed of the air pump 31 is higher than that in the normal power generation, and the increased oxygen more than that in the normal power generation is supplied (refer to S101).

Proceeding to Step S107, ECU 60 determines whether or not the first startup purge is completed by purging a predetermined purge amount. Whether or not the predetermined purge amount has been purged can be determined, for example, based on the opening time of the purge valve 26, or the like.

In Step S107, if the ECU 60 determines that the first purge is not completed (No), it returns to the process in Step S107, and if the ECU 60 determines that the first purge is completed (Yes), it proceeds to Step S108.

In Step S108, the ECU 60 sets the power generation allowed flag (refer to the time "t2" in FIG. 4). Note that, at this time, only the first startup purge is performed, and all the purge amount to be discharged by the startup purge is not discharged, however, since a new fuel gas has been already diffused to the anode flow channel 12 of the fuel cell stack 10, there is no possibility that the stoichiometric deficiency occurs even if the power generation is started after the first startup purge is completed.

Then, proceeding to Step S109, the ECU 60 turns ON the contactor 44 (connects the fuel cell stack 10 to the external loads), and starts obtaining the power generation current from the fuel cell stack 10. Further, in Step S109, with respect to the driving rotational speed of the air pump 31, the ECU 60 maintains a state higher than or equal to a predetermined rotational speed (higher than that in the normal power generation), and supplies the increased oxygen more than that in the normal power generation (refer to the time "t2" in FIG. 4). Furthermore, in Step S109, the ECU 60 stops the driving of the hydrogen pump 27 (refer to the time "t2" in FIG. 4). In addition, the ECU 60 starts supplying the supply amount corresponding to the load by performing PWM control for the first injector 23A.

In Step S110, the ECU 60 determines whether or not a predetermined waiting time has elapsed since the stop of the driving of the hydrogen pump 27. Note that, the predetermined waiting time is a time required for the circulation rate of the circulation gas circulating in the anode circulation flow channel to become the reduced circulation rate from the mixing promotion rate since the driving of the hydrogen pump 27 is stopped or the reduction of the driving rotational speed is started, and is set based on a test or the like in advance. In a case of stopping the driving of the hydrogen pump 27 as in the present embodiment, the predetermined waiting time is a time required for the circulation rate to become zero.

In Step S110, if the ECU 60 determines that the predetermined waiting time has not elapsed (No), it returns to the process in Step S110, and if the ECU 60 determines that the predetermined waiting time has elapsed (Yes), it proceeds to Step S111.

Further, in Step S111, the ECU 60 performs the second startup purge by continuously opening the purge valve 26 (refer to the time "t3" in FIG. 4). Here, the circulation rate of the circulation gas at the time of performing the second startup purge is a reduced circulation rate reduced to be less than the mixing promotion rate (in the present embodiment, the circulation rate is zero), and is in a state where much gas can be discharged when the purge valve 26 is opened. Therefore, the second startup purge is performed in a state where the purge efficiency is higher than that of the first startup purge. Note that, the purge valve 26 is open in Step S111, however, since the driving rotational speed of the air pump 31 is higher than that in the normal power generation (refer to S109), hydrogen of high concentration is never discharged to the outside of the vehicle.

Further, in Step S111, the ECU 60 reduces the hydrogen amount supplied from the first injector 23A, and lowers the anode pressure. Hereby, it is possible to improve the purge efficiency of the second startup purge.

Proceeding to Step S112, the ECU 60 determines whether or not the second purge is completed by purging the predetermined purge amount. Whether or not the second startup purge is completed can be determined, for example, based on the valve opening time of the purge valve 26, or the like.

In Step S112, if the ECU 60 determines that the second purge is completed (Yes), it proceeds to Step S113, and if the ECU 60 determines that the predetermined time is not elapsed (No), it repeats the process in Step S112.

In Step S113, the ECU 60 stops the hydrogen pump 27 (in the present embodiment, maintains the stop state), and controls the driving states of the air pump 31 and the first injector 23A to be in the normal state. Hereby, the ECU 60 starts supplying the supply amount corresponding to the load (refer to the time "t4" in FIG. 4), and performs the normal power generation (End).

As described above, the fuel cell system 1 according to the first embodiment performs the startup purge by dividing the startup purge into the first startup purge and the second startup purge while adjusting the circulation rate of the circulation gas, and thereby it is possible to achieve both of improving purge efficiency and preventing deterioration of the fuel cell.

Further, the fuel cell system 1 according to the first embodiment starts power generation in the fuel cell after completion of the first startup purge in the startup purge, and thereby it is possible to shorten the time until supplying power from the system startup.

Furthermore, the fuel cell system 1 according to the first embodiment uses the hydrogen pump 27 for adjusting the circulation rate of the circulation gas, and thereby it is easy to set the circulation rate of the circulation gas to be the mixing promotion rate.

Figure 5:
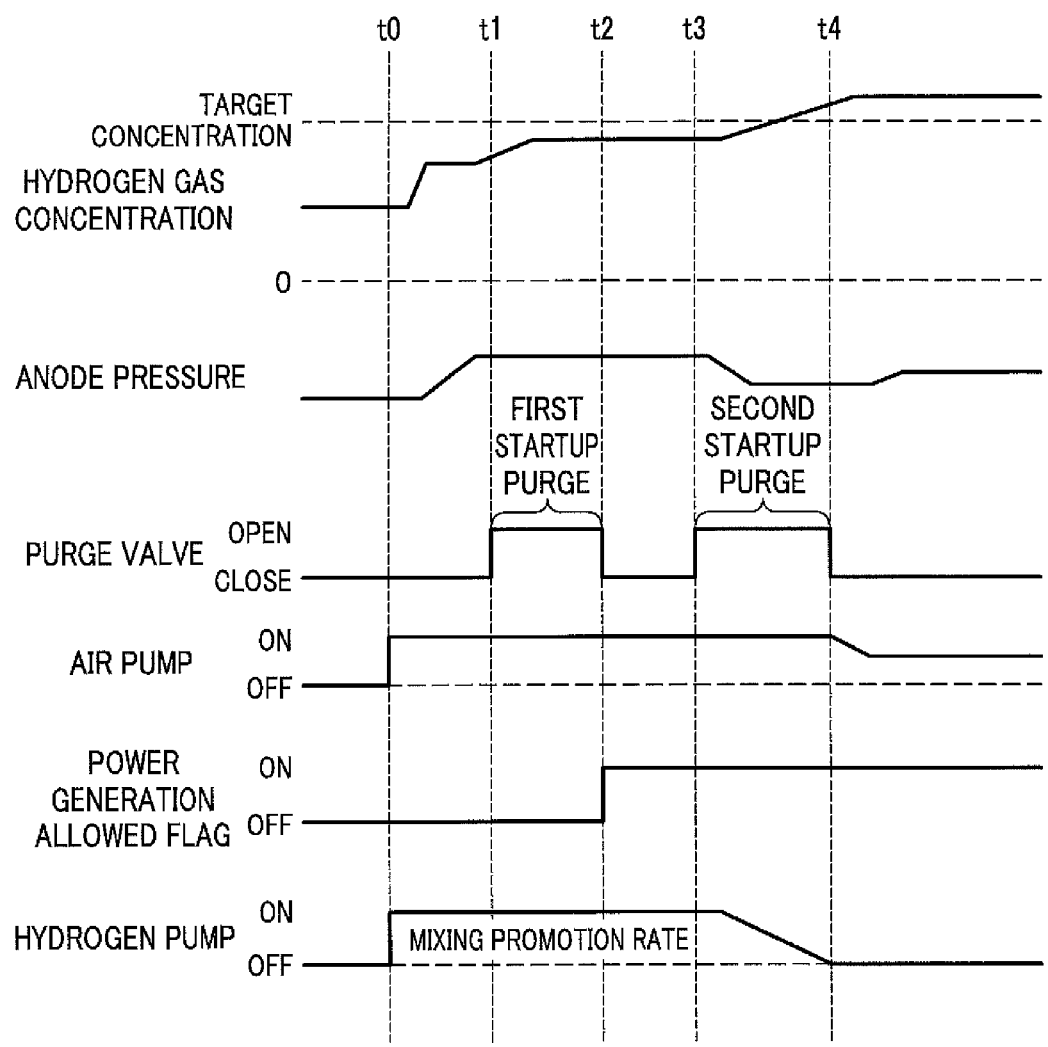
FIG. 5 is a timing chart showing an operation example of a fuel cell system according to a modified example of the first embodiment.

The fuel cell system 1 according to the first embodiment has been described above, but the present invention is not limited to the examples described in the first embodiment. In the present embodiment, before performing the second startup purge, the circulation rate of the circulation gas is reduced to the reduced circulation rate from the mixing promotion rate (refer to "t2", "t3" in FIG. 4), but the present invention is not limited thereto. For example, as shown in FIG. 5, the circulation rate of the circulation gas may be reduced to the reduced circulation rate from the mixing promotion rate during the second startup purge (refer to "t3 to t4" in FIG. 5). This modified example can also reduce the circulation rate of the circulation gas during the second startup purge, thereby performing the second startup purge in a state where the purge efficiency is high.

Further, in the first embodiment, the circulation rate during performing the second startup purge is set to be the reduced circulation rate which is a constant rate, but the present invention is not limited thereto. For example, according to the modified example shown in FIG. 5, the hydrogen concentration is increased by performing the second startup purge (refer to "t3 to t4" in FIG. 5), however, it may be configured to gradually reduce the driving rotational speed of the hydrogen pump 27 as the hydrogen concentration increases. Hereby, in addition to improving the purge efficiency, it is possible to ensure the stoichiometry while reducing the power consumption associated with the driving of the hydrogen pump.

In the fuel cell system 1 according to the first embodiment, a case in which the circulation gas rate is adjusted by the hydrogen pump 27 has been described above. Next, a fuel cell system 1a according to a second embodiment which includes an ejector 24 and adjusts the circulation gas rate through the first injector 23A will be described.

(Second Embodiment)

Figure 6:
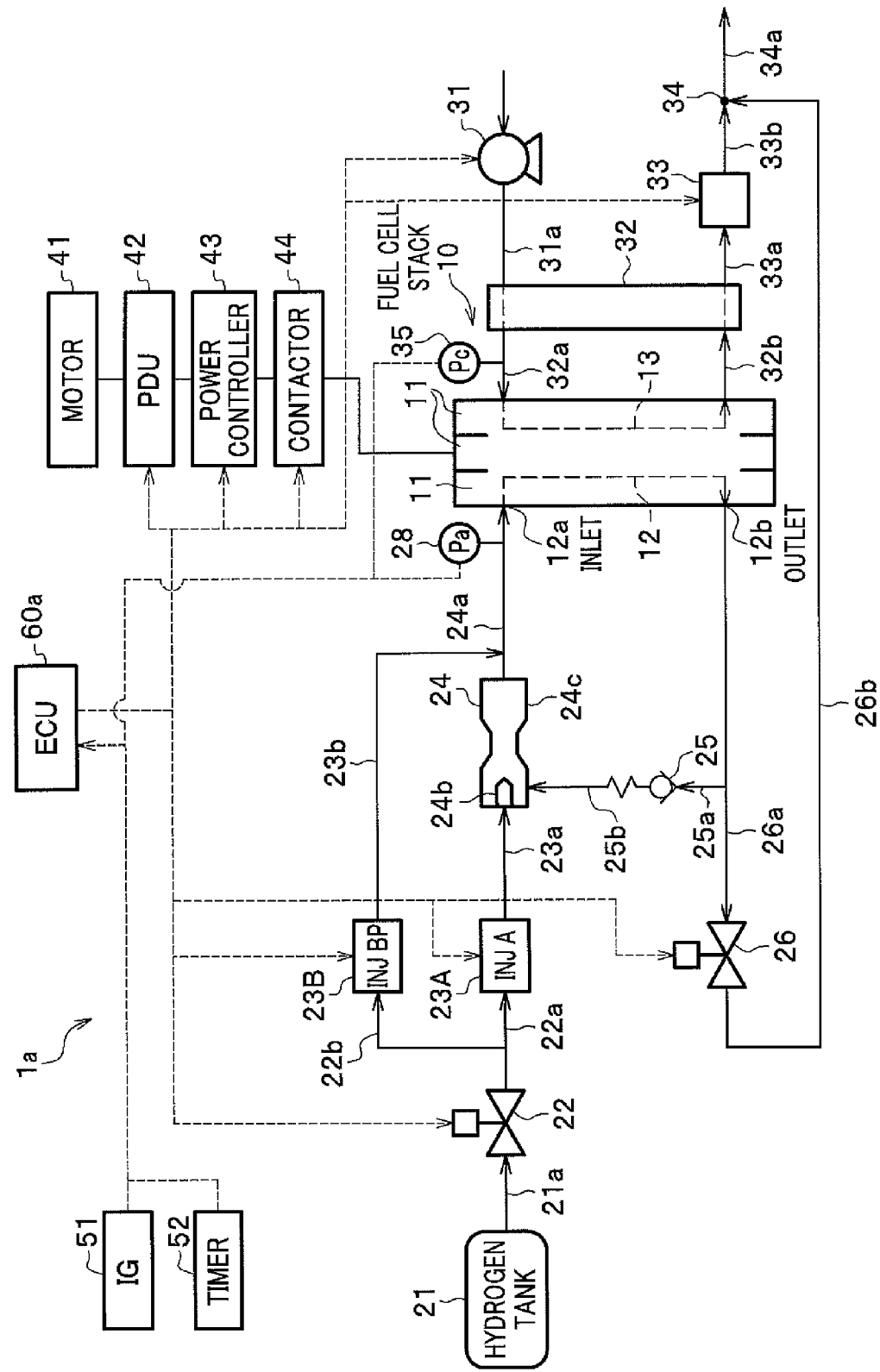
FIG. 6 is an overall block diagram of a fuel cell system according to a second embodiment of the present invention.

First, the configuration of the fuel cell system 1a according to the second embodiment will be described with reference to FIG. 6. As shown in FIG. 6, the fuel cell system 1a according to the second embodiment does not have the hydrogen pump 27, and the pipes 27a and 27b. Instead of them, a circulation passage (a pipe 25a and a pipe 25b) which connects a part (23a, 24a) of the fuel gas supply passage and a part (pipe 26a) of the fuel off-gas discharge passage is provided, and the ejector 24 is provided at the connection point thereof. The details will be described below.

The ejector 24 is provided at the connection point between the pipe 25b and the fuel gas supply passage (23a, 24a). The ejector 24 includes a nozzle 24b for generating a negative pressure by ejecting hydrogen (hydrogen from the first injector 23A), and a diffuser 24c which mixes hydrogen with the anode off-gas (fuel off-gas) sucked by the negative pressure in the pipe 25a and the pipe 25b, and supplies the mixed gas toward the pipe 24a (anode flow channel 12). Further, the anode off-gas containing unconsumed hydrogen discharged from the anode flow channel 12 is adapted to be circulated by the ejector 24. In addition, in the middle of the circulation passage (pipe 25a and pipe 25b), a check valve 25 for preventing reverse flow of the anode off-gas is provided. Further, on the pipe 26a, a gas-liquid separator (not shown) for separating liquid water entrained in the anode off-gas is provided.

Further, the fuel cell system 1a according to the second embodiment is provided with a bypass supply passage (22b, 23b), which is bifurcated from a part (22a) of the fuel gas supply passage and bypasses the first injector 23A and the ejector 24 to be connected to a part (24a) of the fuel gas supply passage, and a second injector 23B disposed on the bypass supply passage. Note that, the second injector 23B according to the present embodiment is the same type (having the same performance) as the first injector 23A, however, in the present invention, the second injector 23B is not limited thereto, but may be one capable of injecting hydrogen of larger flow rate than that of the first injector 23A.

Further, the ECU 60a in the fuel cell system 1a according to the second embodiment is configured to perform the same process as the ECU 60 in the fuel cell system 1 according to the first embodiment. However, with respect to a function (circulation rate adjusting unit) which adjusts a circulation rate of a circulation gas, the ECU 60a is configured to perform the following processes.

The ECU 60a has a function of controlling the circulation rate of the circulation gas circulating in the anode circulation flow channel so as to be the mixing promotion rate by driving the first injector 23A when the ECU 60a has detected the ON signal of the IG 51. Further, the ECU 60a has a function of stopping the driving of the first injector 23A when the ECU 60a has detected that the power generation allowed flag is set. Furthermore, the ECU 60a has a function of driving the second injector 23B when performing the second startup purge.

Next, an operation when the ECU 60a detects the ON signal of the IG 51 and starts up the fuel cell system 1a will be described with reference to FIGS. 7, 8.

Figure 7:
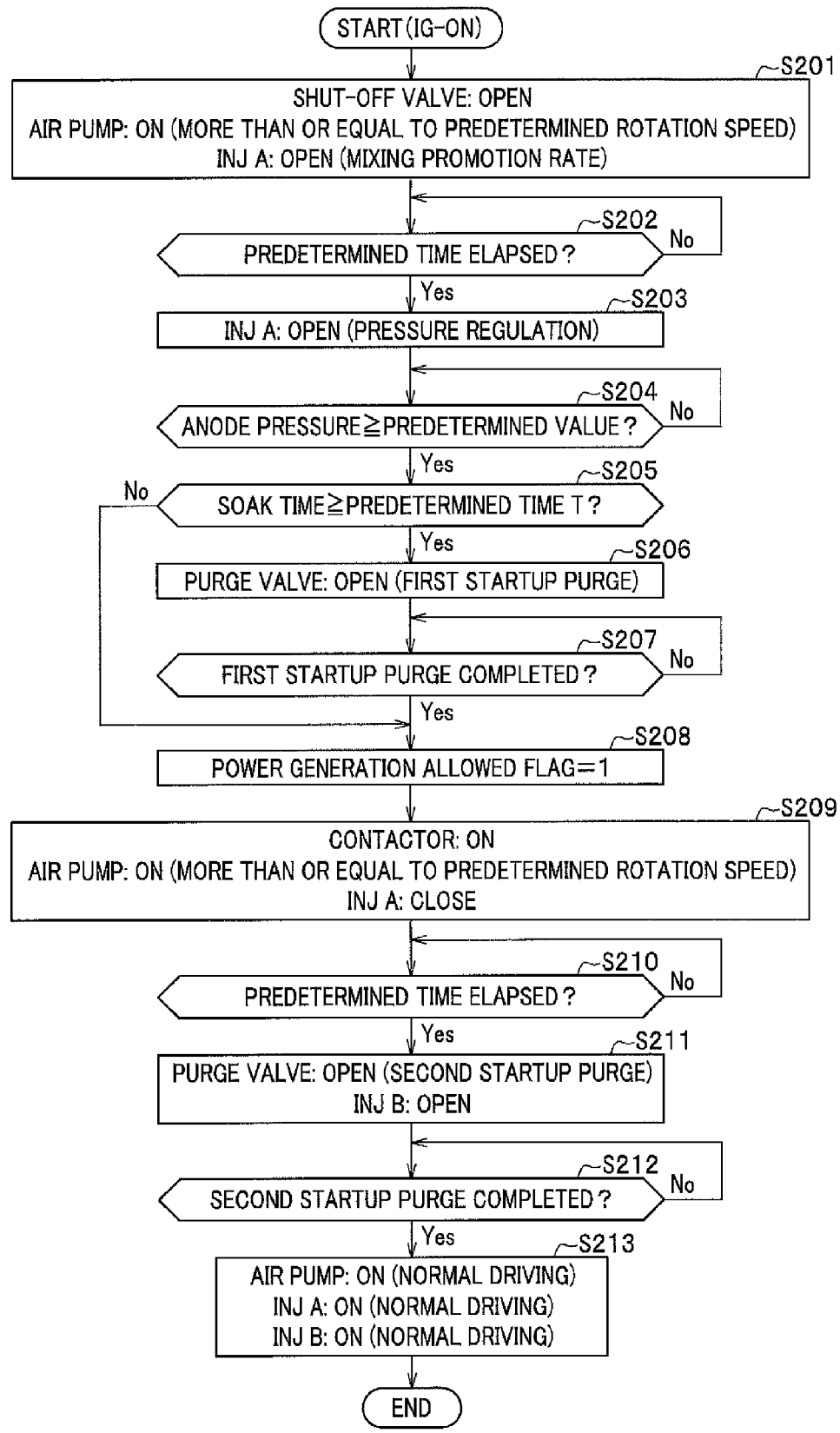
FIG. 7 is a flowchart showing an operation flow of the fuel cell system at startup of the fuel cell system in the second embodiment.
Figure 8:
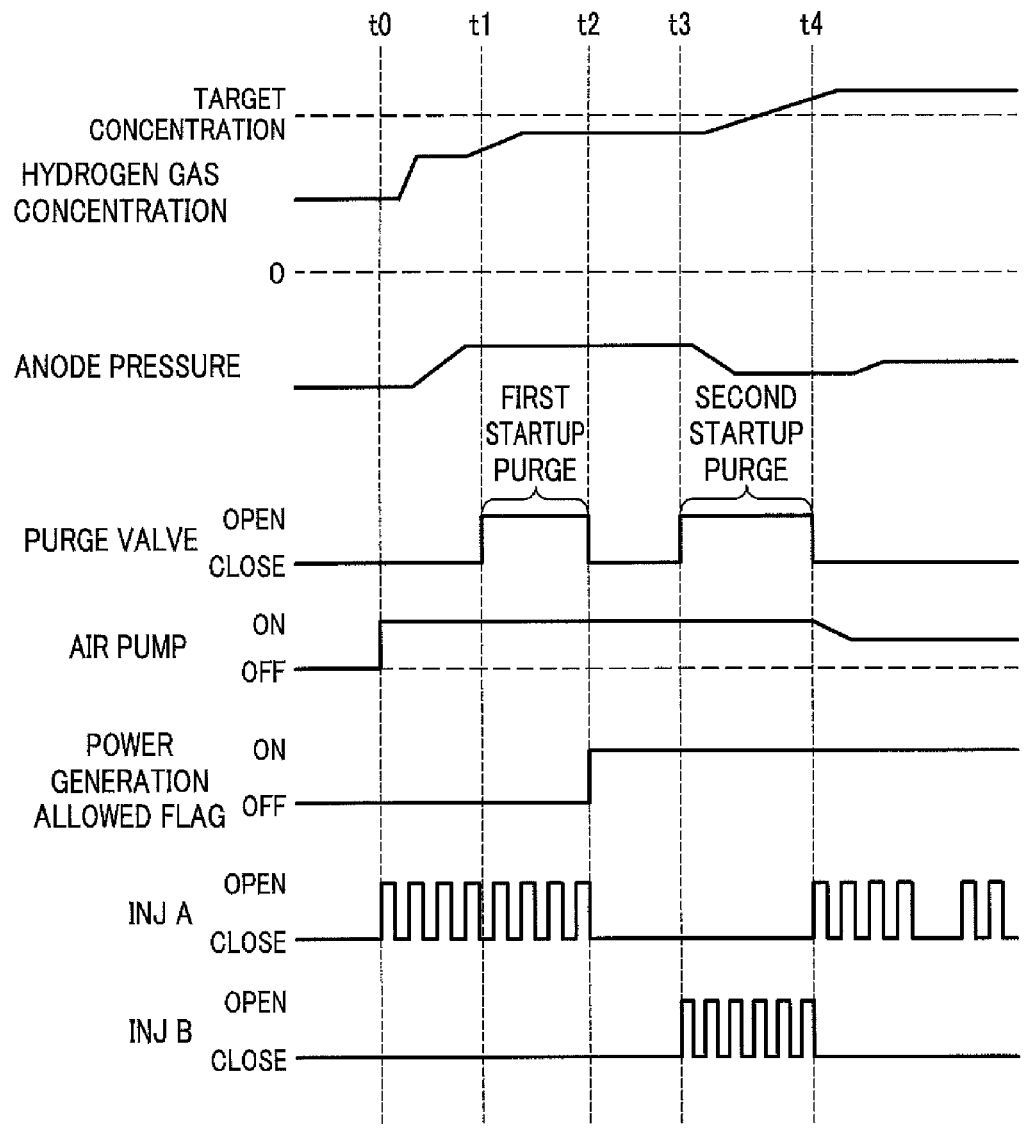
FIG. 8 is a timing chart showing an operation example of the fuel cell system at startup of the fuel cell system in the second embodiment.

As shown in FIG. 7, when the ECU 60a detects the ON signal of the IG 51 (START), in Step S201, the ECU 60a opens the shut-off valve 22 and supplies air to the cathode flow channel 13 by driving (turning ON) the air pump 31. Note that, in this case, the air pump 31 is driven at a rotational speed higher than or equal to a predetermined rotational speed (higher than that in the normal power generation), and is adapted to supply the increased oxygen more than that in the normal power generation.

Further, in Step S201, the ECU 60a starts (turns ON) the driving of the first injector 23A. Note that, the ECU 60a performs the PWM control so that the circulation rate of the circulation gas circulating in the anode circulation flow channel becomes the mixing promotion rate, and adjusts the hydrogen amount supplied from the first injector 23A.

Then, proceeding to Step S202, the ECU 60a determines whether or not a predetermined time has elapsed. Note that, the predetermined time means a time required for the air circulating in the anode flow channel to reach the mixing promotion rate since the start of the driving of the first injector 23A, and is determined based on a test or the like in advance.

In Step S202, if the ECU 60a determines that the predetermined time has elapsed (Yes), it proceeds to Step S203, and if the ECU 60a determines that the predetermined time has not elapsed (No), it repeats the process in Step S202.

In Step S203, the ECU 60a controls the driving amount of the first injector 23A and increases the hydrogen to be supplied so that the anode pressure of the fuel cell stack 10 becomes a predetermined value. Note that the predetermined value (target pressure) is a pressure required for eliminating the hydrogen concentration gradient between the inlet 12a side and the outlet 12b side of the anode flow channel 12, and is determined based on a test or the like in advance.

Proceeding to Step S204, the ECU 60a determines whether or not the anode pressure detected by the pressure sensor 28 is higher than or equal to the predetermined value.

In Step S204, if the ECU 60a determines that the anode pressure is lower than the predetermined value (No), it waits until the anode pressure becomes higher than or equal to the predetermined value while repeating the process in Step S204. On the other hand, if the ECU 60a determines that the anode pressure is higher than or equal to the predetermined value (Yes), it proceeds to Step S205.

In Step S205, the ECU 60a determines whether or not the soak time is longer than or equal to a predetermined time T.

In Step S205, if the ECU 60a determines that the soak time is longer than or equal to the predetermined time T (Yes), it proceeds to Step S206, and if the ECU 60a determines that the soak time is shorter than the predetermined time T (No), it proceeds to Step S208.

In Step S206, the ECU 60a continuously opens the purge valve 26, and performs the first startup purge. Note that, even if the purge valve 26 is opened in this case, there is no possibility that hydrogen of high concentration is discharged to the outside of the vehicle, because the driving rotational speed of the air pump 31 is higher than that in the normal power generation, and the increased oxygen more than that in the normal power generation is supplied (refer to S201).

Proceeding to Step S207, the ECU 60a determines whether or not the first startup purge is completed by purging a predetermined purge amount.

In Step S207, if the ECU 60a determines that the first startup purge has not been completed (No), it returns to the process in Step S207, and if the ECU 60a determines that the first startup purge has been completed (Yes), it proceeds to Step S208.

In Step S208, the ECU 60a sets the power generation allowed flag.

In Step S209, the ECU 60a turns ON the contactor 44, connects the fuel cell stack 10 to the external loads, and starts obtaining the power generation current from the fuel cell stack 10. Further, in Step S209, with respect to the driving rotational speed of the air pump 31, the ECU 60 maintains a state higher than that in the normal power generation. Furthermore, in Step S209, the ECU 60a stops the driving of the injector 23A and reduces the circulation rate in the anode circulation flow channel so as to be the reduced circulation rate.

Proceeding to Step S210, the ECU 60a determines whether or not a predetermined time has elapsed. Note that, the predetermined time is a time required for the circulation rate in the anode flow channel to become the mixing promotion rate since the driving of the first injector 23A is stopped, and is determined based on a test or the like in advance.

In Step S210, if the ECU 60a determines that the predetermined time has not elapsed (No), it returns to the process in Step S210, and if the ECU 60a determines that the predetermined time has elapsed (Yes), it proceeds to Step S211.

Further, in Step S211, the ECU 60a continuously opens the purge valve 26, and performs the second startup purge. Here, since the circulation rate of the circulation gas is the reduced circulation rate reduced to be less than the mixing promotion rate during performing the first startup purge, the second startup purge is adapted to be performed in a state where the purge efficiency is higher than that of the first startup purge. Further, even if the purge valve 26 is opened in this case, there is no possibility that hydrogen of high concentration is discharged to the outside of the vehicle, because the driving rotational speed of the air pump 31 is higher than that in the normal power generation.

Proceeding to Step S212, the ECU 60a determines whether or not the second startup purge is completed, that is, whether or not a predetermined amount of gas has been purged since the purge valve 26 is opened. Whether or not the predetermined amount of gas has been purged can be determined, for example, based on the valve opening time of the purge valve 26, or the like.

In Step S212, if the ECU 60a determines that the second startup purge has been completed (Yes), it proceeds to Step S213, and if the ECU 60a determines that the second startup purge has not been completed (No), it repeats the process in Step S212.

In Step S213, the ECU 60a controls the driving states of the air pump 31, the first injector 23A, and the second injector 23B so as to be in normal states, starts supplying the supply amount corresponding to the load (refer to "t4" in FIG. 4), and performs the normal power generation (End).

As described above, the fuel cell system 1a according to the second embodiment performs the startup purge by dividing the startup purge into the first startup purge and the second startup purge while adjusting the circulation rate of the circulation gas by controlling the drive of the first injector 23A, and thereby it is possible to achieve both of improving purge efficiency and preventing deterioration of the fuel cell. Further, the fuel cell system 1a according to the second embodiment can also shorten the time until supplying power since the system startup.

The fuel cell system 1a according to the second embodiment, including the first injector 23A, the second injector 23B, and the ejector 24, has been described above, but the present invention is not limited to the examples described above. For example, by adding the hydrogen pump 27 and the circulation passage (27a, 27b) described in the first embodiment (see FIG. 1) to the configuration of the fuel cell system 1a according to the second embodiment, the ECU 60a may be configured to adjust the circulation rate by controlling the drives of the first injector 23A and the hydrogen pump 27.

Further, in the embodiments, if the soak time is shorter than the predetermined time T, the fuel cell system is configured not to perform the first startup purge, but the present invention is not limited thereto. For example, if the fuel cell system is configured to perform a scavenging, that is, if the scavenging is performed even if the soak time is shorter than the predetermined time T, the air is adapted to exist in the anode flow channel 12 of the fuel cell stack 10. Therefore, if the ECU determines whether or not the scavenging has been performed, and determined that the scavenging has been performed, the fuel cell system may be configured to perform the first startup purge regardless of whether or not the soak time is shorter than the predetermined time T.

REFERENCE SIGNS LIST 1, 1a: fuel cell system
10: fuel cell stack
23A: first injector (circulation device)
23B: second injector
21a, 22a, 23a, 24a: pipe (fuel gas supply passage)
26a: pipe (fuel off-gas discharge passage)
25a, 25b: pipe (fuel off-gas circulation passage)
27a, 27b: pipe (fuel off-gas circulation passage)
24: ejector
26: purge valve
27: hydrogen pump (circulation device)
28: air pump
60, 60a: ECU (control device)

The invention claimed is:
1. A control method of a fuel cell system comprising:
a fuel cell for generating power by being supplied with a fuel gas and an oxidant gas;

a fuel gas supply passage for connecting the fuel cell and a fuel tank;
a fuel off-gas discharge passage in which a fuel off-gas discharged from the fuel cell flows;
a fuel off-gas circulation passage for connecting the fuel off-gas discharge passage and the fuel gas supply passage;
a purge valve which is disposed on the fuel off-gas discharge passage and on the downstream side of a connection point with the fuel off-gas circulation passage, and discharges the fuel off-gas by the valve opening;
a circulation device for circulating the fuel off-gas via the fuel off-gas circulation passage; and
a control device for performing a startup purge by dividing the startup purge into a first startup purge and a second startup purge,
wherein the control device has:
  a circulation rate adjusting unit that adjusts a circulation rate of a circulation gas by controlling a driving amount of the circulation device;
  a first startup purge unit that performs the first startup purge; and
  a second startup purge unit that performs the second startup purge after the first startup purge, and
wherein the control method of the fuel cell system includes following steps:
  a step of detecting a startup signal of the fuel cell;
  a step of increasing the circulation rate of the circulation gas to a mixing promotion rate capable of promoting mixing of the fuel gas with the circulation gas by controlling the circulation device through the circulation rate adjusting unit after detecting the startup signal;
  a step of performing the first startup purge by opening the purge valve through the first startup purge unit after increasing the circulation rate of the circulation gas;
  a step of performing the second startup purge by opening the purge valve through the second startup purge unit after completing the first startup purge; and
  a step of reducing the gas circulation rate to be less than the mixing promotion rate by controlling the circulation device through the circulation rate adjusting unit before completing the second startup purge and after completing the first startup purge,
wherein the control device has a power generation start unit that starts power generation in the fuel cell, and
wherein the power generation start unit starts power generation in the fuel cell after completing the first startup purge.

2. The control method of the fuel cell system according to claim 1,
  wherein the circulation device includes a circulation pump disposed on the fuel off-gas circulation passage, and
  wherein the circulation rate adjusting unit adjusts the circulation rate of the circulation gas by controlling a driving rotational speed of the circulation pump.

3. The control method of the fuel cell system according to claim 1, the fuel cell system further comprising:
  an oxidant gas supply passage in which the oxidant gas is supplied by connecting the fuel cell and an air pump;
  an oxidant off-gas discharge passage in which an oxidant off-gas is discharged from the fuel cell flows; and
  a dilution part for diluting the fuel off-gas with the oxidant off-gas,
  wherein the control unit has an oxidant gas supply amount adjusting unit that adjusts a supply amount of the oxidant gas by controlling a driving rotational speed of the air pump, and
  wherein the oxidant gas supply amount adjusting unit increases the supply amount of the oxidant gas until the completion of the second startup purge since a start of the power generation in the fuel cell so as to be more than a load equivalent amount corresponding to a load state in the fuel cell.

4. The control method of the fuel cell system according to claim 1,
  wherein the control device has a pressure regulating unit that regulates a pressure of the fuel gas supplied to the fuel cell, and
  wherein the pressure regulating unit reduces the pressure of the fuel gas during performing of the second startup purge to be less than that during performing of the first startup purge.

5. The control method of the fuel cell system according to claim 1, further comprising:
  a step of setting a total purge amount from a soak time of the fuel cell,
  wherein an amount of the first startup purge is smaller than the total purge amount, and an amount of the second startup purge is an amount obtained by subtracting the amount of the first startup purge from the total purge amount.

6. The control method of the fuel cell system according to claim 1,
  wherein the first startup purge is performed when an anode pressure becomes a predetermined pressure.

7. The control method of the fuel cell system according to claim 3,
  wherein after completing the second startup purge, the circulation device is stopped and power generation is performed by setting a supply amount of the fuel gas and a supply amount of the oxidant gas to correspond to a load.

8. A control method of a fuel cell system comprising:
a fuel cell for generating power by being supplied with a fuel gas and an oxidant gas;
a fuel as supply passage for connecting the fuel cell and a fuel tank;
a fuel off-gas discharge passage in which a fuel off-gas discharged from the fuel cell flows;
a fuel off-gas circulation passage for connecting the fuel off-gas discharge passage and the fuel gas supply passage;
a purge valve which is disposed on the fuel off-gas discharge passage and on the downstream side of a connection point with the fuel off-gas circulation passage, and discharges the fuel off-gas by the valve opening;
a circulation device for circulating the fuel off-gas via the fuel off-gas circulation passage; and
a control device for performing a startup purge by dividing the startup purge into a first startup purge and a second startup purge,
wherein the control device has:
  a circulation rate adjusting unit that adjusts a circulation rate of a circulation gas by controlling a driving amount of the circulation device;
  a first startup purge unit that performs the first startup purge; and a second startup purge unit that performs the second startup purge after the first startup purge, and wherein the control method of the fuel cell system includes following steps:

a step of detecting a startup signal of the fuel cell;

a step of increasing the circulation rate of the circulation gas to a mixing promotion rate capable of promoting mixing of the fuel gas with the circulation gas by controlling the circulation device through the circulation rate adjusting unit after detecting the startup signal;

a step of waiting until a pressure in a fuel gas flow passage of the fuel cell becomes a predetermined pressure to allow power generation after increasing the circulation rate of the circulation gas;

a step of determining whether or not a soak time of the fuel cell is within a predetermined time not to require performing the first startup purge after the step of waiting;

a step of allowing power generation in the fuel cell without performing the first startup purge when it is determined that the soak time of the fuel cell is within the predetermined time;

a step of performing the second startup purge by opening the purge valve through the second startup purge unit after completing the first startup purge, when the first startup purge is performed; and a step of reducing the gas circulation rate to be less than the mixing promotion rate by controlling the circulation device through the circulation rate adjusting unit before completing the second startup purge and after completing the first startup purge, when the first startup purge is performed;

wherein the control device has a power generation start unit that starts power generation in the fuel cell, and wherein the power generation start unit starts power generation in the fuel cell after completing the first startup purge, when the first startup purge is performed.

* * * * *